United States Patent
Yamaguchi et al.

(10) Patent No.: US 10,451,185 B2
(45) Date of Patent: Oct. 22, 2019

(54) SEAL RING

(71) Applicant: TPR CO., LTD., Tokyo (JP)

(72) Inventors: Hitoshi Yamaguchi, Tokyo (JP); Teppei Oga, Tokyo (JP)

(73) Assignee: TPR CO., LTD., Tokyo (JP)

( * ) Notice: Subject to any disclaimer, the term of this patent is extended or adjusted under 35 U.S.C. 154(b) by 82 days.

(21) Appl. No.: 15/538,139

(22) PCT Filed: Oct. 21, 2016

(86) PCT No.: PCT/JP2016/081337
§ 371 (c)(1),
(2) Date: Jun. 20, 2017

(87) PCT Pub. No.: WO2018/061222
PCT Pub. Date: Apr. 5, 2018

(65) Prior Publication Data
US 2019/0040956 A1 Feb. 7, 2019

(30) Foreign Application Priority Data
Sep. 30, 2016 (JP) ................................ 2016-193074

(51) Int. Cl.
*F16J 15/02* (2006.01)
*F16J 15/3272* (2016.01)
(Continued)

(52) U.S. Cl.
CPC ............ *F16J 15/3272* (2013.01); *F16J 9/14* (2013.01); *F16J 15/441* (2013.01)

(58) Field of Classification Search
CPC .......... F16J 9/12; F16J 9/14; F16J 9/20; F16J 15/16; F16J 15/162; F16J 15/441; F16J 15/442; F16J 15/3232
See application file for complete search history.

(56) References Cited

U.S. PATENT DOCUMENTS

| 5,713,578 A | 2/1998 | Terao et al. |
| 7,494,129 B2* | 2/2009 | Breuer ................ F16J 9/14 |
| | | 277/466 |

(Continued)

FOREIGN PATENT DOCUMENTS

| EP | 2587101 A1 | 5/2013 |
| JP | 50-118140 A | 9/1975 |

(Continued)

OTHER PUBLICATIONS

International Search Report for PCT/JP2016/081337, dated Dec. 27, 2016.

(Continued)

*Primary Examiner* — Vishal A Patel
(74) *Attorney, Agent, or Firm* — Merchant & Gould P.C.

(57) ABSTRACT

Provided is a seal ring causing less friction and having a low oil leakage property even under a state in which a shaft rotation frequency or a housing rotation frequency is high, and being capable of reducing a shaft rotation torque. A level difference portion that forms a second width smaller than a first width is formed on a longitudinal sectional shape of the seal ring as viewed in a circumferential direction from a seal ring outer peripheral surface side toward a seal ring inner peripheral surface side. The level difference portion is formed so that a center line of the second width in the circumferential direction of the seal ring in which a sealed fluid flows draws a trajectory of extending along the circumferential direction and shifting from an abutment joint end surface on an inner periphery side of a seal ring abutment joint portion at one end toward an abutment joint end surface on the inner periphery side of the seal ring abutment joint portion at another end so as to be closer to the seal ring contact surface.

4 Claims, 16 Drawing Sheets

CROSS SECTION TAKEN ALONG LINE 6A-6A
α = α1 DEGREES

CROSS SECTION TAKEN ALONG LINE 6E-6E
α = α2 DEGREES

(51) Int. Cl.
F16J 9/14 (2006.01)
F16J 15/44 (2006.01)

(56) References Cited

U.S. PATENT DOCUMENTS

| | | | |
|---|---|---|---|
| 2005/0263963 A1* | 12/2005 | Lai | F16J 15/3408 277/399 |
| 2010/0162987 A1* | 7/2010 | Ishida | F02F 5/00 123/193.6 |
| 2012/0018957 A1* | 1/2012 | Watanabe | F16J 15/441 277/387 |
| 2014/0008876 A1 | 1/2014 | Nagai et al. | |

FOREIGN PATENT DOCUMENTS

| | | |
|---|---|---|
| JP | 2007-078041 A | 3/2007 |
| JP | 2015-028382 A | 2/2015 |
| WO | 2013/094657 A1 | 6/2013 |

OTHER PUBLICATIONS

Search Report for European Patent Application No. 116871798.1, dated Aug. 6, 2018.

* cited by examiner

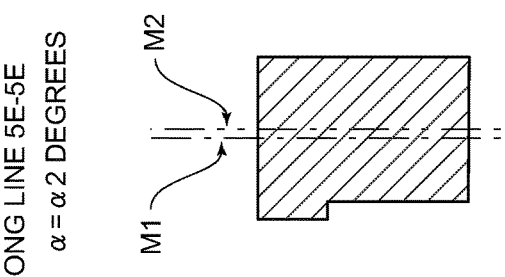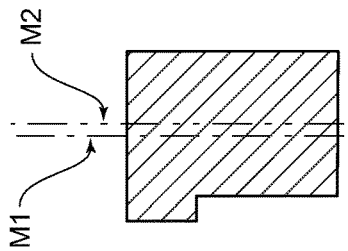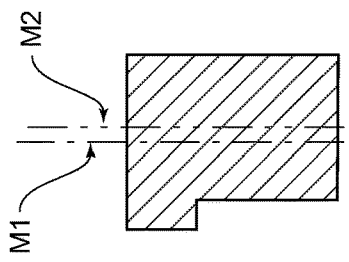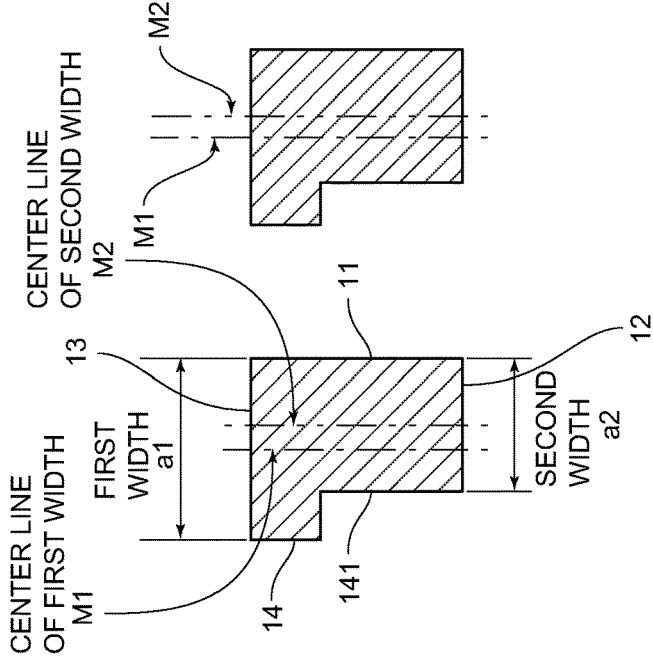

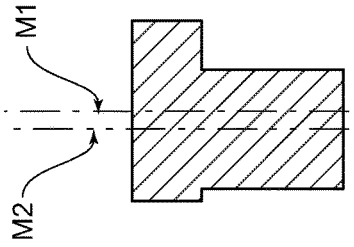
Fig.6E
CROSS SECTION TAKEN
ALONG LINE 6E-6E
α = α2 DEGREES
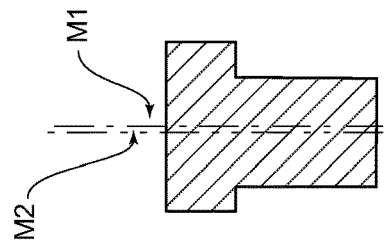
Fig.6D
CROSS SECTION TAKEN
ALONG LINE 6D-6D
α = 270 DEGREES
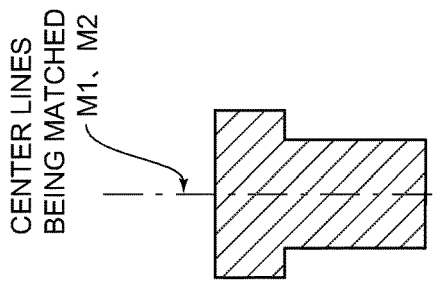
Fig.6C
CROSS SECTION TAKEN
ALONG LINE 6C-6C
α = 180 DEGREES
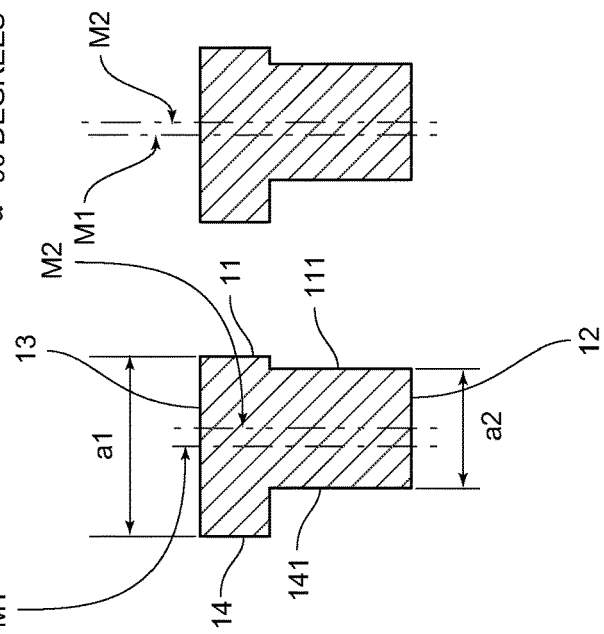
Fig.6B
CROSS SECTION TAKEN
ALONG LINE 6B-6B
α = 90 DEGREES
Fig.6A
CROSS SECTION TAKEN
ALONG LINE 6A-6A
α = α1 DEGREES

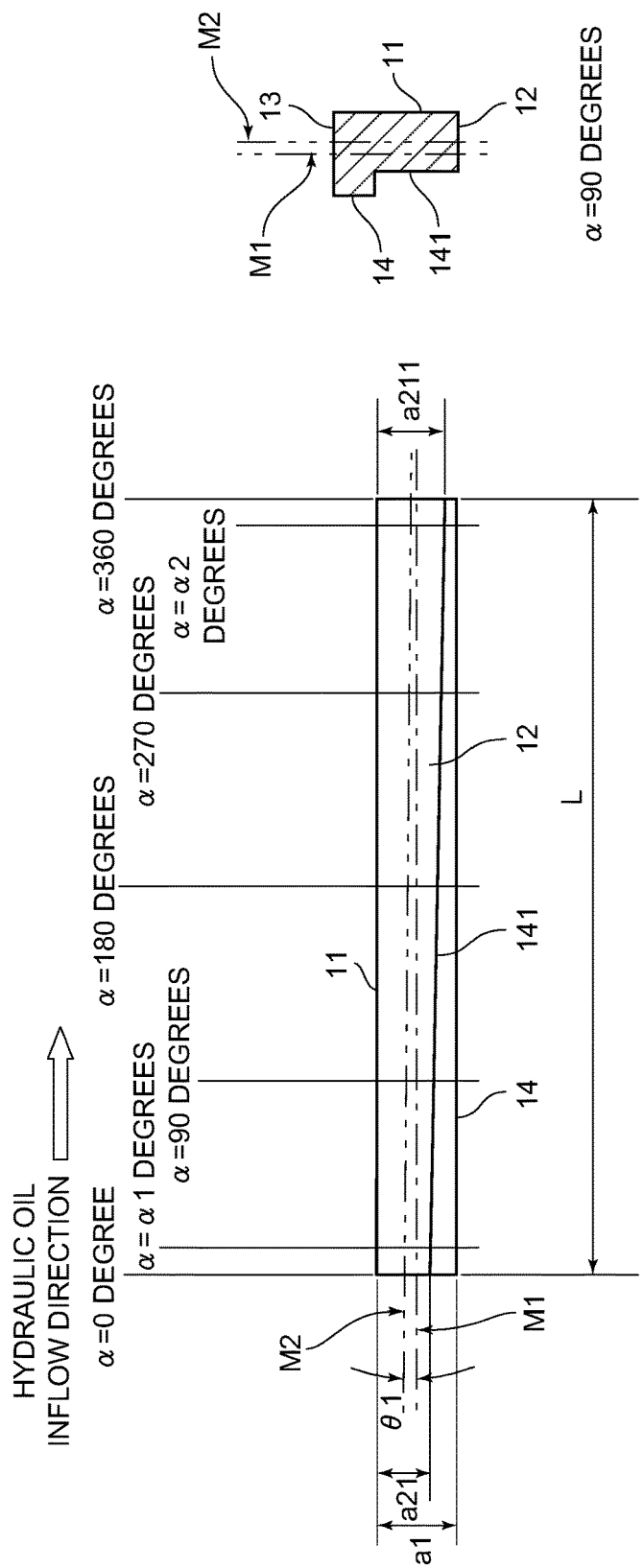

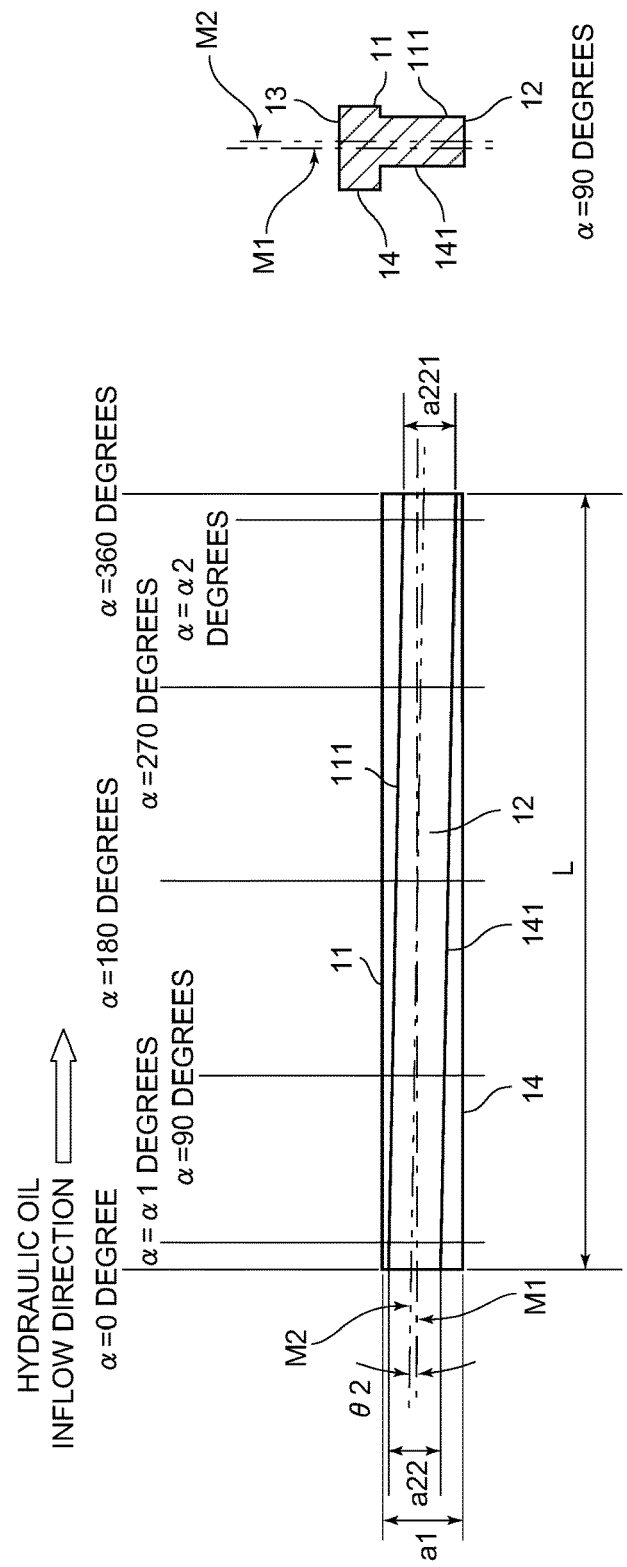

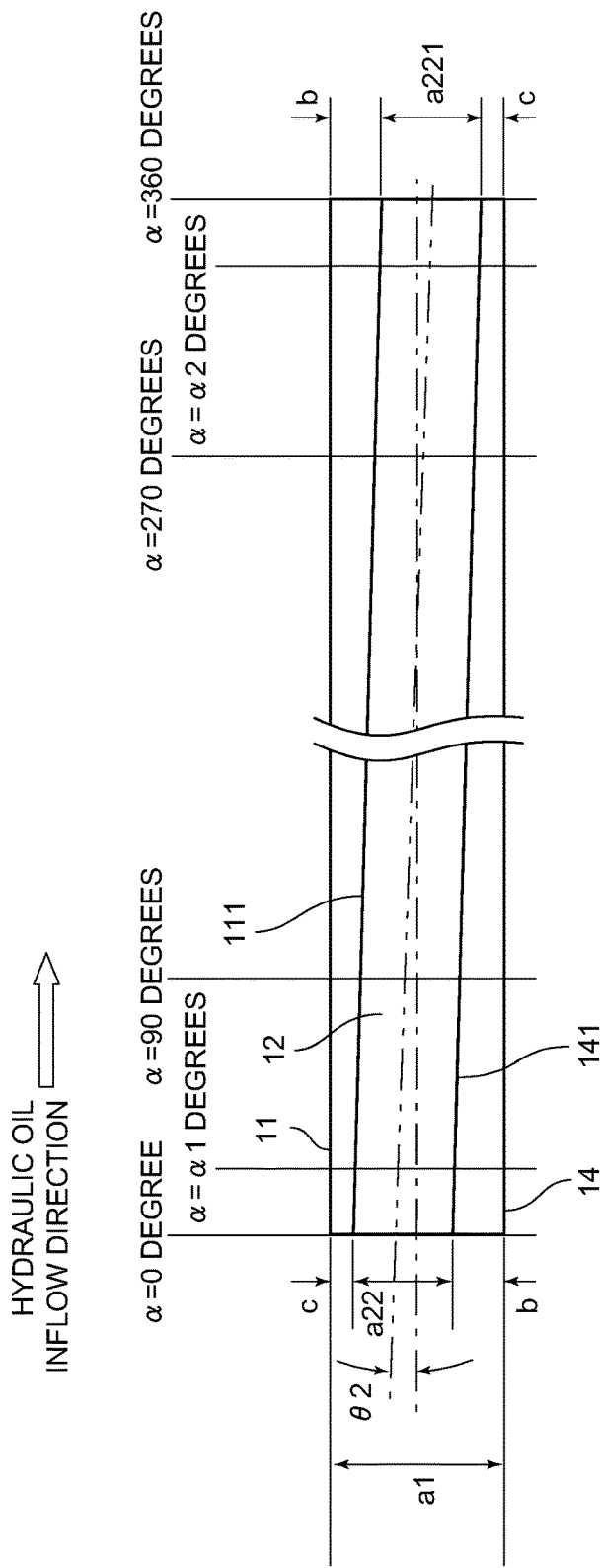

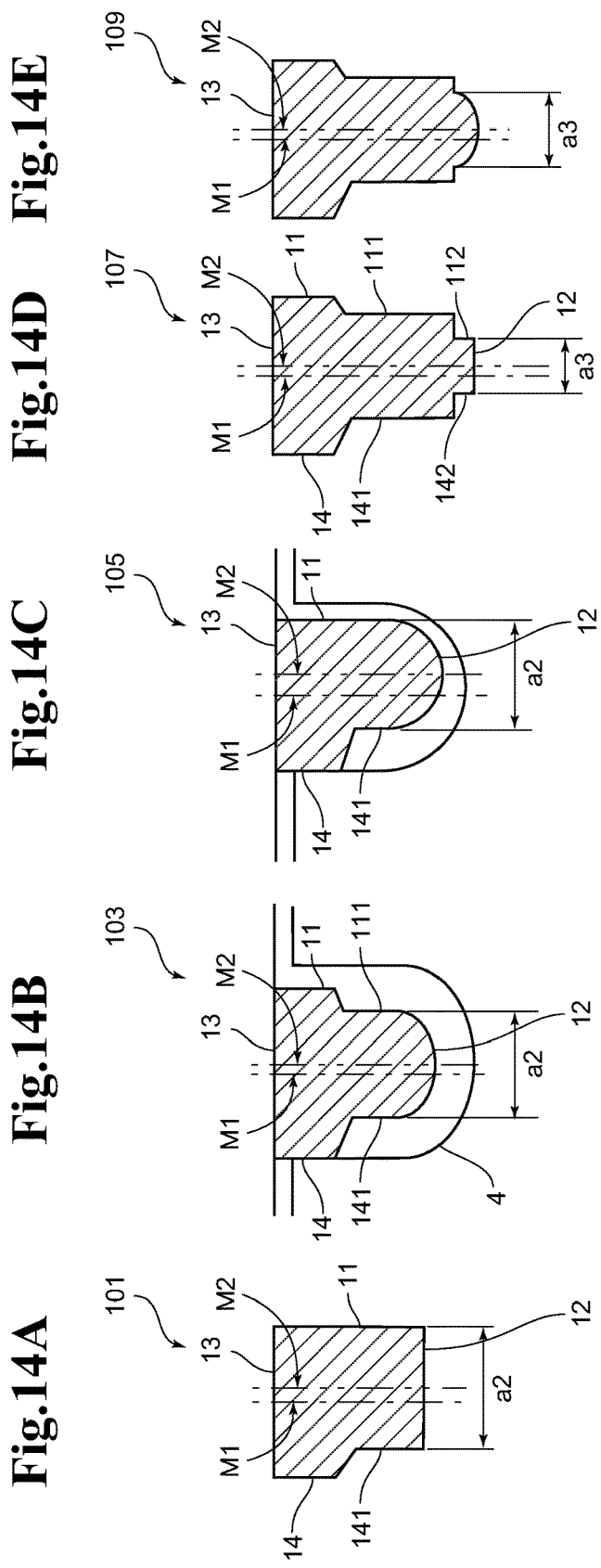

SEAL RING

This application is a National Stage of PCT/JP2016/081337, filed Oct. 21, 2016, which claims benefit of Japanese Patent Application No. 2016-193074, filed Sep. 30, 2016, which applications are incorporated herein by reference. To the extent appropriate, a claim of priority is made to above disclosed applications.

TECHNICAL FIELD

The present invention relates to a seal ring to be used in an apparatus, which uses a fluid pressure of a fluid such as hydraulic operating oil (hereinafter referred to as "hydraulic oil"), such as an automatic transmission (hereinafter referred to as "AT") and a continuously variable transmission (hereinafter referred to as "CVT") for an automobile.

BACKGROUND

In recent years, in order to improve fuel efficiency of an automobile, reduction in drive loss of an automatic transmission such as an AT or a CVT has been required. A seal ring is mounted to the automatic transmission for the purpose of hydraulic sealing. However, a friction loss of the seal ring leads to the drive loss of the automatic transmission. Therefore, reduction in friction of the seal ring is an important issue. Further, a capacity of an oil pump for the automatic transmission greatly affects the drive loss. Therefore, reduction in amount of leakage of oil through a gap between the seal ring and a shaft annular groove or a housing and reduction in capacity of the oil pump have been desired. In order to reduce the drive loss of the automatic transmission so as to improve the fuel efficiency of the automobile, low friction performance and high oil sealing performance have been demanded for the seal ring.

FIG. 1 is an illustration of a basic structure of a hydraulic sealing device to which the seal ring is mounted. Seal rings 1 are mounted to shaft annular grooves 4, which are formed in an outer peripheral surface of a shaft 2 so as to be located on both sides in an axial direction of a hydraulic oil passage 3. The hydraulic oil supplied from the hydraulic oil passage 3 is received with a seal ring pressure-receiving surface 11 and an inner peripheral surface 12. With this, a seal ring outer peripheral surface 13 is brought into contact with an inner peripheral surface of a housing 5, and a seal ring contact surface 14 is brought into contact with a side surface of the shaft annular groove 4, thereby preventing leakage of the hydraulic oil. In general, the shaft 2 rotates, and the housing 5 is fixed. However, an interchanged combination is possible.

In order to reduce the friction (friction loss) of the seal ring, there has typically been employed a technique of reducing a received pressure load generated by pressing the seal ring contact surface serving as a main sliding surface against the shaft annular groove. Specifically, a seal ring having a sectional shape formed so as to receive a hydraulic pressure of the hydraulic oil between the seal-ring contact surface and the shaft annular groove is adopted to reduce the received pressure load on the shaft annular groove, which is caused by the hydraulic pressure of the hydraulic oil received on the seal ring pressure-receiving surface.

In Patent Literature 1, there is disclosed a resin seal ring. The resin seal is connected in a ring-like shape by connecting abutment joint portions each having a composite step cut shape, and a thinned portion having a polygonal or convex sectional shape is formed on an inner diameter surface side of both side surface portions of the seal ring so as to continue over an entire periphery of the seal ring.

In Patent Literature 2, there is disclosed a seal ring. The seal ring is mounted to an annular groove formed in one of members corresponding to a housing having a shaft hole and a rotary shaft to be inserted into the shaft hole, and is brought into contact with a surface of another member. And it is brought into slidably contact with a side wall surface on a non-sealed fluid side of the annular groove so as to seal an annular gap between the members. A V-shaped concave portion along a ring circumferential direction, which serves as a non-contact portion with the side wall surface, is formed at least on a part of an inner-diameter side end portion of a ring side surface which serves as a sliding surface sliding with the side wall surface.

CITATION LIST

Patent Literature

[PTL 1] JP 2007-078041 A
[PTL 2] JP 2015-028382 A

SUMMARY OF INVENTION

Technical Problem

In Patent Literature 1, there are disclosed results of a rotation-torque test and an oil leakage test for a seal ring having an outer diameter of 50 mm, a ring width of 2.0 mm, and a ring radial thickness of 1.8 mm as seal ring dimensions. The rotation-torque test was conducted with conditions including a temperature of 80° C., a shaft rotation frequency of 4,000 rpm, and hydraulic pressures of 0.4 Mpa, 0.8 MPa, and 1.2 MPa. The oil leakage test was conducted with the following conditions. An automobile automatic transmission oil (manufactured by SHOWA SHELL SEKIYU K.K. Gelco ATF) was used. The seal ring was mounted between a cylinder and a shaft made of carbon steel S45C in Japanese Industrial Standard, and a hydraulic pressure of 0.5 MPa was applied as oil sealing, and the shaft was rotated at 4,000 rpm. An oil leakage amount was measured at temperatures of from 30° C. to 120° C. through use of a measuring cylinder.

It is described that a drag torque can be reduced by reduction in contact area of a side surface of the seal ring so that occurrence of an energy loss with the shaft can be decreased. However, evaluation for the shaft rotation speed in a high rotation range of 6,000 rpm or higher is not carried out.

In Patent Literature 2, there are disclosed results of a rotation-torque test and an oil leakage test for a seal ring having an outer diameter φ of 50 mm, an inner diameter φ of 47 mm, a ring width of 1.5 mm, and a ring thickness of 1.5 mm as seal ring dimensions. The rotation-torque test was conducted with conditions including a hydraulic pressure of from 0.5 MPa to 3.0 MPa, an oil temperature of from 30° C. to 150° C., and a rotation frequency of from 1,000 rpm to 7,000 rpm. The oil leakage test was conducted with conditions including a hydraulic pressure of from 0.5 MPa to 3.0 MPa, a rotation speed of from 1,000 rpm to 7,000 rpm, and an oil temperature of from 30° C. to 150° C., specifically, four conditions corresponding to 30° C., 70° C., 110° C., and 150° C. However, detailed results are unknown. The V-shaped concave portion along the ring circumferential direction, which serves as the non-contact portion with the side wall surface, is formed on a part of the inner-diameter side end portion of the ring side surface which serves as the sliding surface with the side wall surface of the annular groove. Therefore, a sealing fluid, for example, the hydraulic oil, is likely to appropriately flow out on the sliding surface through the concave portion. However, a contact area with the ring side surface serving as the sliding surface with the side wall surface of the annular groove is large. As a result, a shaft rotation torque cannot be reduced.

The present invention has an object to provide a seal ring causing less friction and having a low oil leakage property, and being capable of reducing a shaft rotation torque, even under a state in which a shaft rotation frequency or a housing rotation frequency is high.

Solution to Problem

In order to solve the above-mentioned problem, according to one aspect of the present invention, there is provided a seal ring, which is to be used in a hydraulic sealing device including a housing having a shaft hole and a shaft to be inserted into the shaft hole, the seal ring to be mounted to a shaft annular groove formed in the shaft, to be brought into contact with an inner peripheral surface of the housing, and to be brought into slidably contact with a side wall surface of the shaft annular groove, which is opposed to a side to which a sealed fluid flows, so as to seal an annular gap between the housing and the shaft, in which, when an axial width of a seal ring outer peripheral surface is a first width, a longitudinal sectional shape of the seal ring as viewed in a circumferential direction has the first width as a maximum axial width of the seal ring and has a level difference portion that forms a second width smaller than the first width at a position from the seal ring outer peripheral surface to a seal ring inner peripheral surface, in which the level difference portion is present over an entire periphery in the circumferential direction on, at least, a seal ring contact surface among the seal ring contact surface and a seal ring pressure-receiving surface, the seal ring contact surface being slidably contact with the side wall surface of the shaft annular groove that forms an axial width wider than the first width, that forms the first width, the seal ring pressure-receiving surface being opposing to the seal ring contact surface, in which the level difference portion is formed so that, at seal ring abutment joint portions of the seal ring which are opposed to each other, a center line of the second width on an abutment joint end surface on an inner periphery side of the seal ring abutment joint portion at one end at which the abutment joint end surface of the seal ring is positioned on the side to which the sealed fluid flows is positioned on a side closer to the seal ring pressure-receiving surface with respect to a center line of the first width on the same longitudinal cross section of the seal ring as viewed in the circumferential direction, in which the level difference portion is formed so that the center line of the second width on an abutment joint end surface at another end on the inner periphery side of the seal ring abutment joint portion is positioned on a side closer to the seal ring contact surface with respect to the center line of the second width on the abutment joint end surface at the one end on the inner periphery side of the seal ring, in which the level difference portion is formed so that the center line of the second width in the circumferential direction of the seal ring in which the sealed fluid flows draws a trajectory of extending along the circumferential direction and shifting from the abutment joint end surface on the inner periphery side of the seal ring abutment joint portion at the one end toward the abutment joint end surface on the inner periphery side of the seal ring abutment joint portion at the another end so as to be closer to the seal ring contact surface.

Here, the level difference portion may be formed so that the center line of the second width in the circumferential direction of the seal ring in which the sealed fluid flows draws a trajectory of extending along the circumferential direction of the seal ring, shifting from the abutment joint end surface on the inner periphery side of the seal ring abutment joint portion at the one end toward the abutment joint end surface on the inner periphery side of the seal ring abutment joint portion at the another end so as to be closer to the seal ring contact surface, and being in parallel to or matching with a trajectory of the center line of the first width in a part of a circumferential portion excluding seal ring the abutment joint portion.

Further, the level difference portion may be formed so that the center line of the second width in the circumferential direction of the seal ring in which the sealed fluid flows draws a trajectory of extending along the circumferential direction of the seal ring and linearly shifting from the abutment joint end surface on the inner periphery side of the seal ring abutment joint portion at one end toward the abutment joint end surface on the inner periphery side of the seal ring abutment joint portion at the another end so as to be closer to the seal ring contact surface.

The level difference portion may be formed so that, at least at one seal ring abutment joint portion of the seal ring abutment joint portions which are opposed to each other, the center line of the second width in the seal ring circumferential direction in which the sealed fluid flows draws a trajectory of being separated from a trajectory of the center line of the first width in the seal ring circumferential direction to be parallel from the abutment joint end surface to a certain position in the circumferential direction of the seal ring.

The level difference portion that forms the second width may be present on each of both side surfaces of the seal ring, and it is preferred that the longitudinal sectional shape of the seal ring as viewed in the circumferential direction be a convex shape, a trapezoidal shape, or an arc-like shape in a direction toward the seal ring inner peripheral surface.

The level difference portion that forms the second width may be present only on the seal ring contact surface side, and the longitudinal sectional shape of the seal ring as viewed in the circumferential direction may be an arc-like shape so that a distance from the side wall surface of the shaft annular groove increases in a direction toward the seal ring inner peripheral surface on the seal ring pressure-receiving surface side.

A level difference portion that forms a third width as an axial width smaller than the second width on an inner periphery side of the level difference portion that forms the second width from the seal ring outer peripheral surface side may be formed, and it is preferred that the longitudinal sectional shape of the seal ring, which forms the third width, as viewed in the circumferential direction be a convex shape, a trapezoidal shape, or an arc-like shape in a direction toward the seal ring inner peripheral surface.

BRIEF DESCRIPTION OF DRAWINGS

is an enlarged view of a portion surrounded by the dashed circle of FIG. 2(A)

FIG. 5(A) to FIG. 5(E) are longitudinal sectional views of the seal ring of FIG. 3 as viewed in a circumferential direction and in a hydraulic oil inflow direction, FIG. 5(A) is a sectional view taken along the line 5A-5A, FIG. 5(B) is a sectional view taken along the line 5B-5B, FIG. 5(C) is a sectional view taken along the line 5C-5C, FIG. 5(D) is a sectional view taken along the line 5D-5D, and FIG. 5(E) is a sectional view taken along the line 5E-5E.

FIG. 6(A) to FIG. 6(E) are longitudinal sectional views of the seal ring of FIG. 4 as viewed in the circumferential direction and in the hydraulic oil inflow direction, FIG. 6(A) is a sectional view taken along the line 6A-6A, FIG. 6(B) is a sectional view taken along the line 6B-6B, FIG. 6(C) is a sectional view taken along the line 6C-6C, FIG. 6(D) is a sectional view taken along the line 6D-6D, and FIG. 6(E) is a sectional view taken along the line 6E-6E.

FIG. 7(A) is a development view of an inner peripheral surface of the seal ring of FIG. 2, and FIG. 7(B) is a longitudinal sectional view at α=90 position.

FIG. 8(A) is a development view of an inner peripheral surface of the seal ring of FIG. 4, and FIG. 8(B) is a longitudinal sectional view at α=90 position.

FIG. 9 is a partially enlarged view of FIG. 8A.

FIG. 7(B) is mounted to a shaft annular groove.

FIG. 14 are longitudinal sectional views of another embodiments of the seal ring according to the present invention at α=90 degree position on an hydraulic oil inflow side as viewed in the circumferential direction, FIG. 14(A) is a view for illustrating an embodiment of the seal ring having the level difference only on the seal ring contact surface side, in which a level difference portion that forms the second width has a tapered shape rather than being in parallel to an outer peripheral surface of the seal ring, FIG. 14(B) is a view for illustrating an embodiment of the seal ring having the level differences both on the seal ring contact surface side and the seal ring pressure-receiving surface side, in which the seal ring inner peripheral surface has an arc-like shape, FIG. 14(C) is a view for illustrating an embodiment of the seal ring having the level difference only on the seal ring contact surface side, in which the seal ring inner peripheral surface has an arc-like shape, FIG. 14(D) is a view for illustrating an embodiment of the seal ring having the level differences both on the seal ring contact surface side and the seal ring pressure-receiving surface side, in which the seal ring has a third width, and FIG. 14(E) is a view for illustrating another embodiment of the seal ring having the level differences both on the side of the contact surface of the seal ring and the side of the pressure-receiving surface of the seal ring, in which the seal ring has the third width.

DESCRIPTION OF EMBODIMENTS

Hereinafter, a seal ring of the present invention is described in detail with reference to the drawings.

Figure 1:
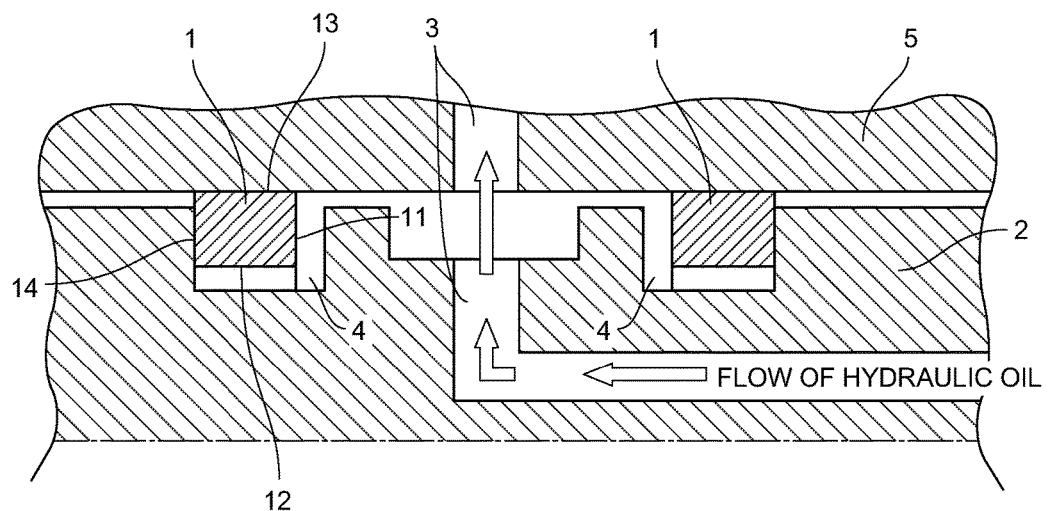
FIG. 1 is a sectional view for illustrating a basic structure of a hydraulic sealing device to which a seal ring is mounted.
Figure 2A:
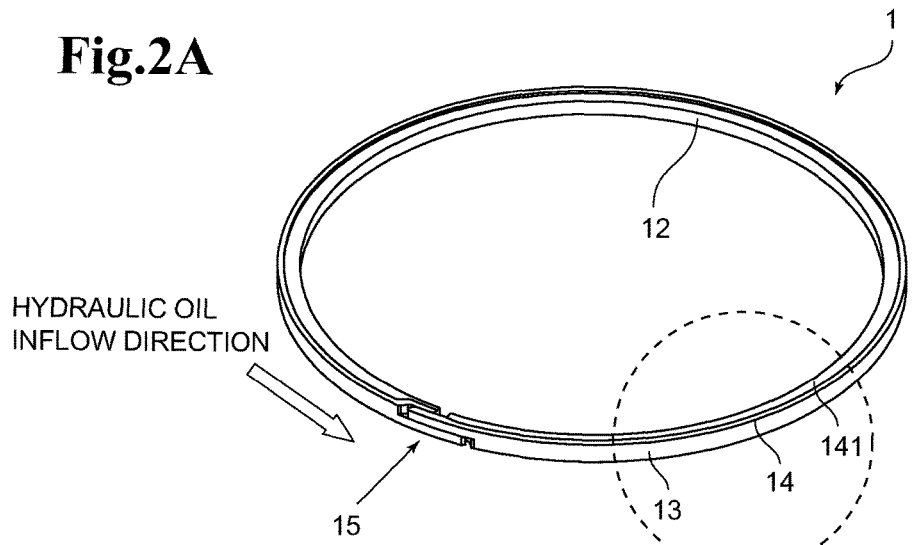
FIG. 2(A) is a perspective view of a seal ring according to one aspect of the present invention, as viewed from a contact surface side of a seal ring having a level difference only on the contact surface side of the seal ring, FIG. 2(B)
Figure 2B:
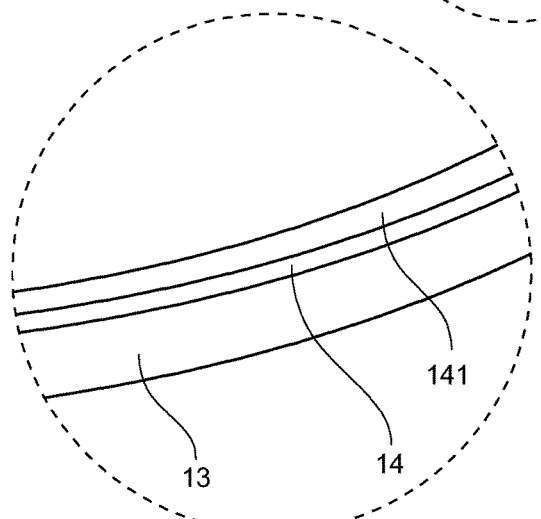
FIG. 2(C) is a perspective view of an abutting joint portion as viewed from an inner peripheral surface side. See FIG. 3 for α=α1 degree position and α=α2 degree position.

FIG. 2(A) is a perspective view of a seal ring 1 according to one aspect of the present invention, which has a level difference only on a contact surface side, as viewed from a side of the contact surface of the seal ring 1 (hereinafter referred to as "seal ring contact surface"). FIG. 2(B) is an enlarged view of a portion surrounded by the dashed circle of FIG. 2(A). A contact-surface side non-contact surface 141, which is a surface forming a second width, is formed over an entire periphery on a side closer to a seal ring contact surface 14.

Figure 2C:
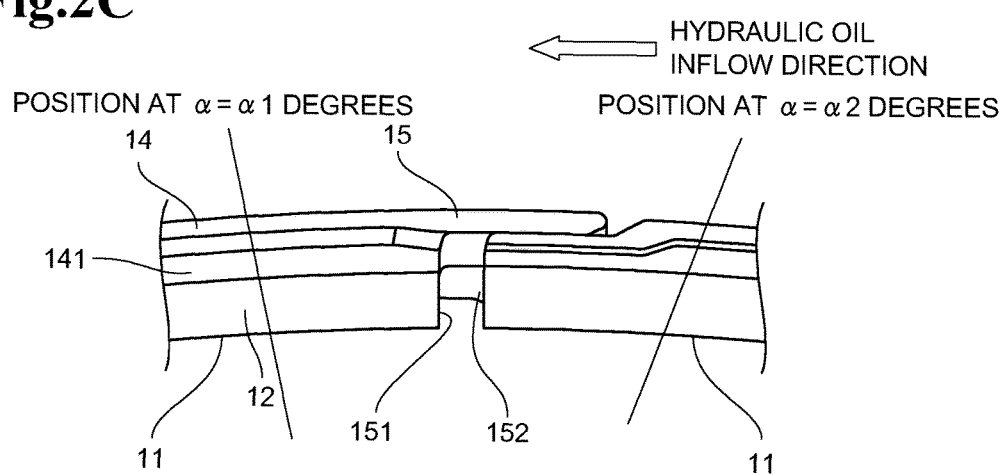

FIG. 2(C) is a perspective view of an abutting joint portion 15 having a composite step cut type abutment joint shape on the seal ring contact surface 14 side as viewed from an inner peripheral surface side. The arrow in FIG. 2(C) indicates a direction in which the hydraulic oil flows with respect to the seal ring 1. On an abutting joint end surface 151 on an inner periphery side of a seal ring abutting joint portion at one end and an abutting joint end surface 152 on the inner periphery side of a seal ring abutting joint portion at another end, the contact-surface side non-contact surface 141 that forms the second width is present.

Figure 3:
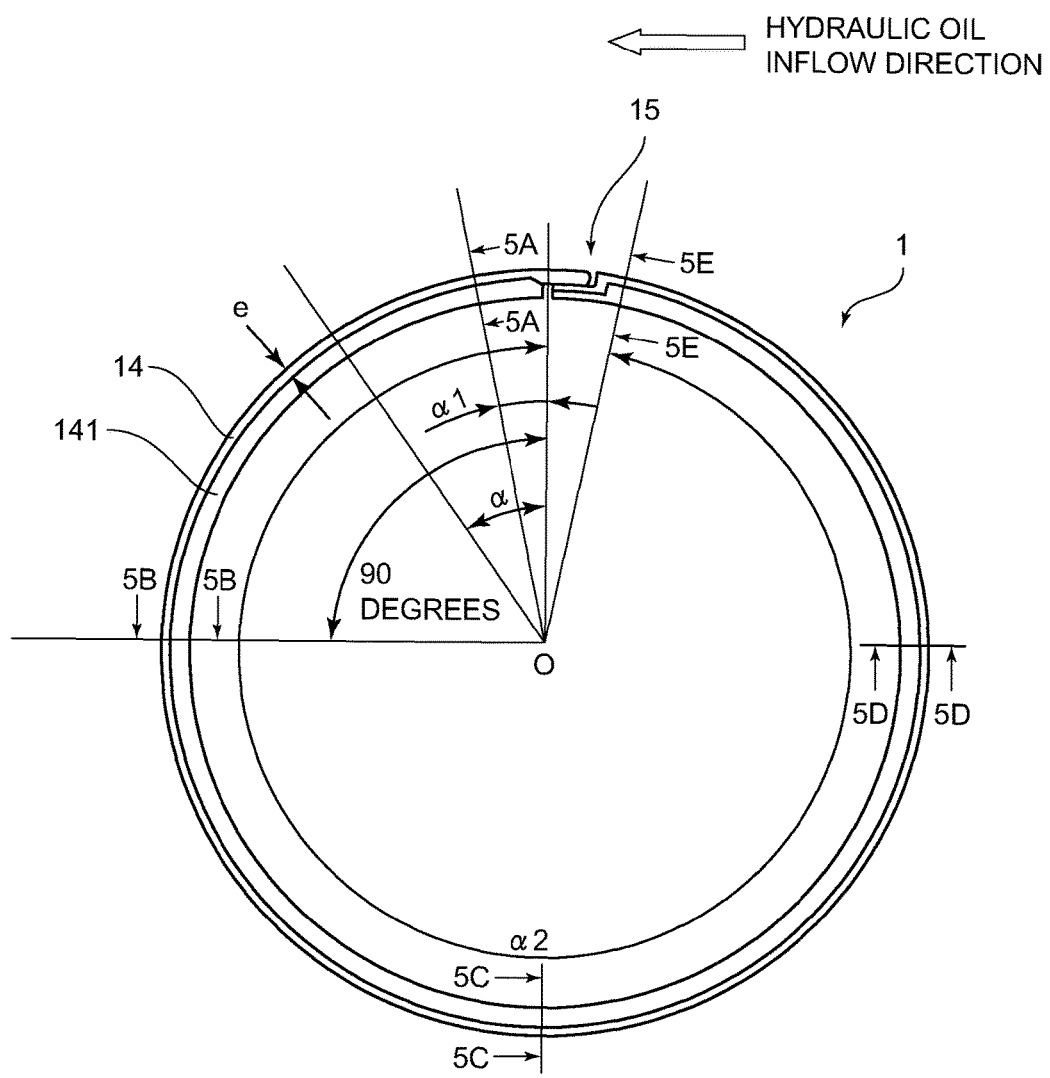
FIG. 3 is a plan view of the seal ring of FIG. 2(A), as viewed from the seal ring contact surface side when the seal ring is mounted to a housing.

FIG. 3 is a plan view of the seal ring 1 of FIG. 2 on the seal ring contact surface 14 side when the seal ring is mounted to a housing. The arrow in FIG. 3 indicates a direction in which the hydraulic oil flows with respect to the seal ring 1. The abutting joint portions 15 which are opposed to each other overlap to form an annular shape. It is noted that a position in a seal ring circumferential direction of a line segment that connects a central position of an abutting joint overlapping portion and a seal ring center O being a center of an inner diameter of the housing is at 0 degrees and a position in a seal ring circumferential direction of the seal ring 1 in, which is the hydraulic oil inflow direction, is at α degrees. When positions in the circumferential direction being the abutment joint portion 15 are α1-degree position and α2-degree position, a range from α1 degrees and α2 degrees, which defines the abutment joint portion 15, is referred to as an abutment joint portion. In general, α1=360−α2 is given, and α1 and α2 fall within a range from 5 degrees to 20 degrees. A radial directional length e of the contact surface 14 that forms a first width is constant except for the abutting joint portion 15. However, the length e is suitably determined depending on a shape of the abutting joint portion in the circumferential range of the abutting joint portion. As sectional positions in the circumferential direction, there are given α=α1 degrees for a cross section taken along the line 5A-5A, α=90 degrees for a cross section taken along the line 5B-5B, α=180 degrees for a cross section taken along the line 5C-5C, α=270 degrees for a cross section taken along the line 5D-5D, and α=α2 degrees for a cross section taken along the line 5E-5E.

Figure 4A:
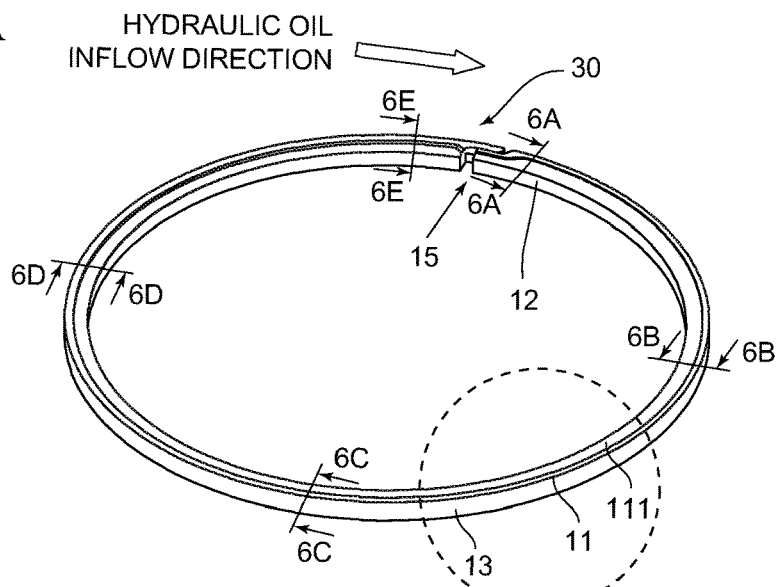
FIG. 4(A) is a perspective view of a seal ring according to another aspect of the present invention, as viewed from a pressure-receiving surface side of the seal ring having level differences on both a seal ring contact surface side and a seal ring pressure-receiving surface side as viewed from the seal ring pressure-receiving surface side.
Figure 4B:
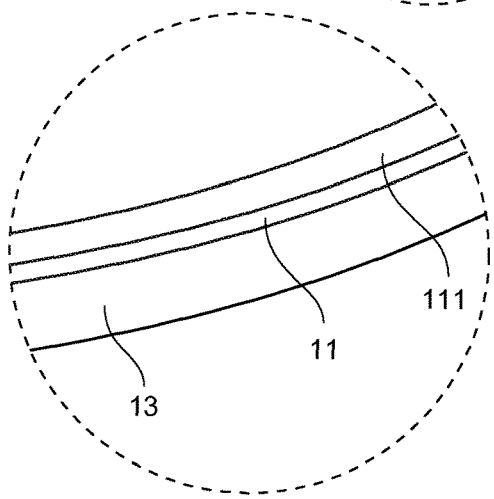
FIG. 4(B) is an enlarged view of a portion surrounded by the dashed circle of FIG. 4(A)
Figure 4C:
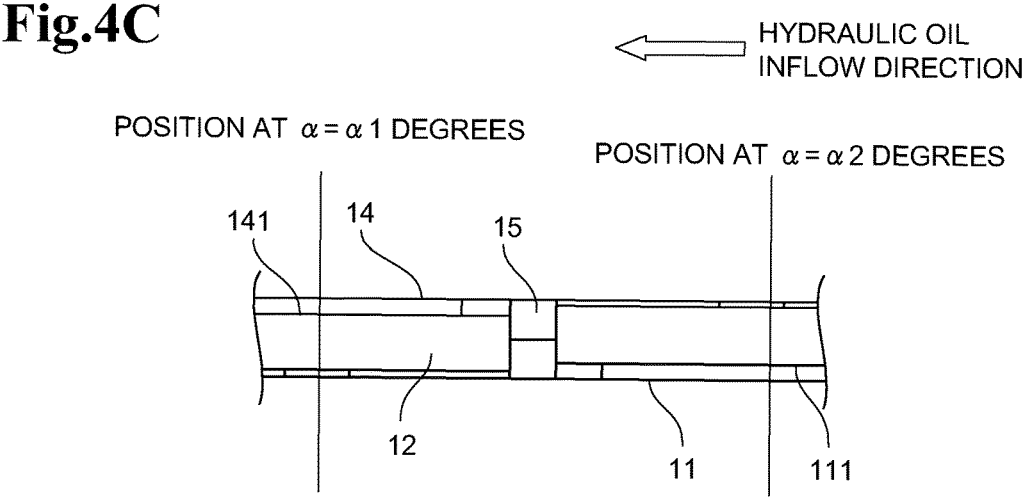
FIG. 4(C) is a front view of an abutting joint portion of FIG. 4(A) as viewed from an inner peripheral surface side.

FIG. 4(A) is a perspective view of a seal ring 30 having level differences on both the seal ring contact surface side and a seal ring pressure-receiving surface side in another aspect of the present invention, as viewed from a side of a pressure-receiving surface 11 of the seal ring 30 (hereinafter referred to as "seal ring pressure-receiving surface"). Similarly to FIG. 3, defining a line as a line segment which connect the central position of the abutting joint overlapping portion, which overlaps when the seal ring is mounted in the housing, and the seal ring center O, which is the center of the inner side of the housing, and defining the angle of the line segment in the seal ring circumferential direction as 0 degree, and defining the circumferential position of the seal ring 30 along the hydraulic oil inflow direction as a degree, each of the sectional position along the circumferential direction is as follows, α=α1 degrees for a cross section taken along the line 6A-6A, α=90 degrees for a cross section taken along the line 6B-6B, α=180 degrees for a cross section taken along the line 6C-6C, α=270 degrees for a cross section taken along the line 6D-6D, and α=α2 degrees for a cross section taken along the line 6E-6E as. It is noted that the circumferential positions, which correspond to the abutting joint portion 15, are defined as the position at α1 degrees and the position at α2 degrees. FIG. 4(B) is an enlarged view of a portion surrounded by the dashed circle of FIG. 4(A). FIG. 4(C) is a front view of the abutting joint portion 15 as viewed from the inner peripheral surface side.

A shape of the abutting joint portion 15 can be formed as a straight abutting joint type, an angled abutting joint type, a stepped abutting joint type, and the like. However, in order to shut off oil flow into a gap portion of the abutting joint so as to improve sealability, it is preferred that the composite step cut type be employed.

Longitudinal sectional shapes of the seal ring 1 as viewed in the circumferential direction, whose shapes are corresponding to the angles indicating the circumferential positions, are illustrated in FIG. 5A to FIG. 5E. The longitudinal sectional shapes are taken at the positions of the cross section along the line 5A-5A to the cross section along the line 5E-5E illustrated in FIG. 3. The shapes are corresponding to the case where the level difference forming a second width a2 is formed only on the seal ring contact surface 14 side.

A first width a1 and the second width a2 have constant width in each the cross sections. However, a center line M2 of the second width a2 is present on the seal ring pressure-receiving surface 11 side with respect to a center line M of the first width, which is continuous within a range in which α is from 0 degrees to 360 degrees (longitudinal sectional shapes at α=0 degrees and α=360 degrees are not shown).

In FIG. 6(A) to FIG. 6(E), there are illustrated longitudinal sectional shapes as viewed in the circumferential direction, the longitudinal sectional shapes are taken at the positions of the cross section along the line 6A-6A to the cross section along the line 6E-6E illustrated in FIG. 4(A), when the level differences that form the second width 2a are formed both on the seal ring contact surface 14 side and the seal ring pressure-receiving surface 11 side. The first width a1 and the second width a2 are the equal width for all the cross sections. The center line M2 of the second width a2 is present on the seal ring pressure-receiving surface 11 side with respect to a center line M1 of the first width, which is continuous within a range in which α is from 0 degree to an angle smaller than 180 degrees. And the center line M2 of the second width a2 matches with the center line M1 of the first width at a 180-degree position. Within a range of from the 180-degree position to 360 degrees, the center line M2 is present on a side of seal ring contact surface 14 side with respect to a center line M1 of the first width. (longitudinal sectional shapes at α=0 degree and α=360 degrees are not shown).

FIG. 7(A) is a development view of the seal ring inner peripheral surface 12 when the level difference forming the second width a2 is formed only on the seal ring contact surface 14 side. FIG. 7(B) is a longitudinal sectional view of the seal ring 1 at α=90 degrees. It is noted that the first width is a1, the second width of an abutting joint end surface at the one end in the hydraulic oil inflow direction is a21, and the second width of an abutting joint end surface at the another end is a211. A trajectory of the center line M1 of the first width and a trajectory of the center line M2 of the second width form an angle θ1 over the entire periphery in the circumferential direction.

Further, it is preferred that the first width and the second width satisfy relationships of $a1/2 \leq a21 \leq 3a1/4$, $a21 < a211$, and $a1-a211 \geq 0.15$ mm.

When a development length of the seal ring is L, a relationship of $\tan \theta1 = (a211-a21)/2L$ is satisfied.

With the presence of the angle θ1 formed between the trajectory of the center line of the second width and the trajectory of the center line of the first width, a dynamic pressure effect of the hydraulic oil according to the present invention can be generated.

FIG. 8(A) is a development view of the seal ring inner peripheral surface 12 when the level differences forming the second width a2 are formed both on the seal ring contact surface 14 side and the seal ring pressure-receiving surface 11 side. FIG. 8(B) is a longitudinal sectional view of the seal ring 1 when α=90 degrees is given. When the level differences that form the second width a2 are formed on both side surfaces corresponding to the seal ring contact surface 14 side and the seal ring pressure-receiving surface 11 side, and sectional areas of spaces on the contact surface side and the pressure-receiving surface side are formed in a perfectly interchanged fashion as in FIG. 8(B), completely the same function is obtained even when the seal ring is assembled to the shaft with the opposite orientation to that of the original orientation.

FIG. 9 is a partially enlarged view of the abutting joint portion of the seal ring 1 in the development view of FIG. 8(A). It is noted that the first width is a1, the second width of the abutting joint end surface at the one end in the hydraulic oil inflow direction is a22, a width of the level difference between the seal ring contact surface 14 and the contact-surface side non-contact surface 141 on the abutting joint end surface is b, a width of the level difference between the seal ring pressure-receiving surface 11 and the pressure-receiving surface side non-contact surface 111 on the abutting joint end surface is c, and the second width on the abutting joint end surface at the another end is a221. An angle θ2 formed between the trajectory of the center line M1 of the first width and the trajectory of the center line M2 of the second width is formed over the entire periphery in the circumferential direction.

In FIG. 8 and FIG. 9, a relationship of a22=a221 is satisfied. It is preferred that relationships of 1/4a1≤b≤1/2a1 and c≥0.15 mm be satisfied.

When a development length of the seal ring is L, a relationship of tan θ2=(b−c)/L is satisfied.

Further, a relationship: a22=a221=a1−b−c is satisfied.

Figure 10:
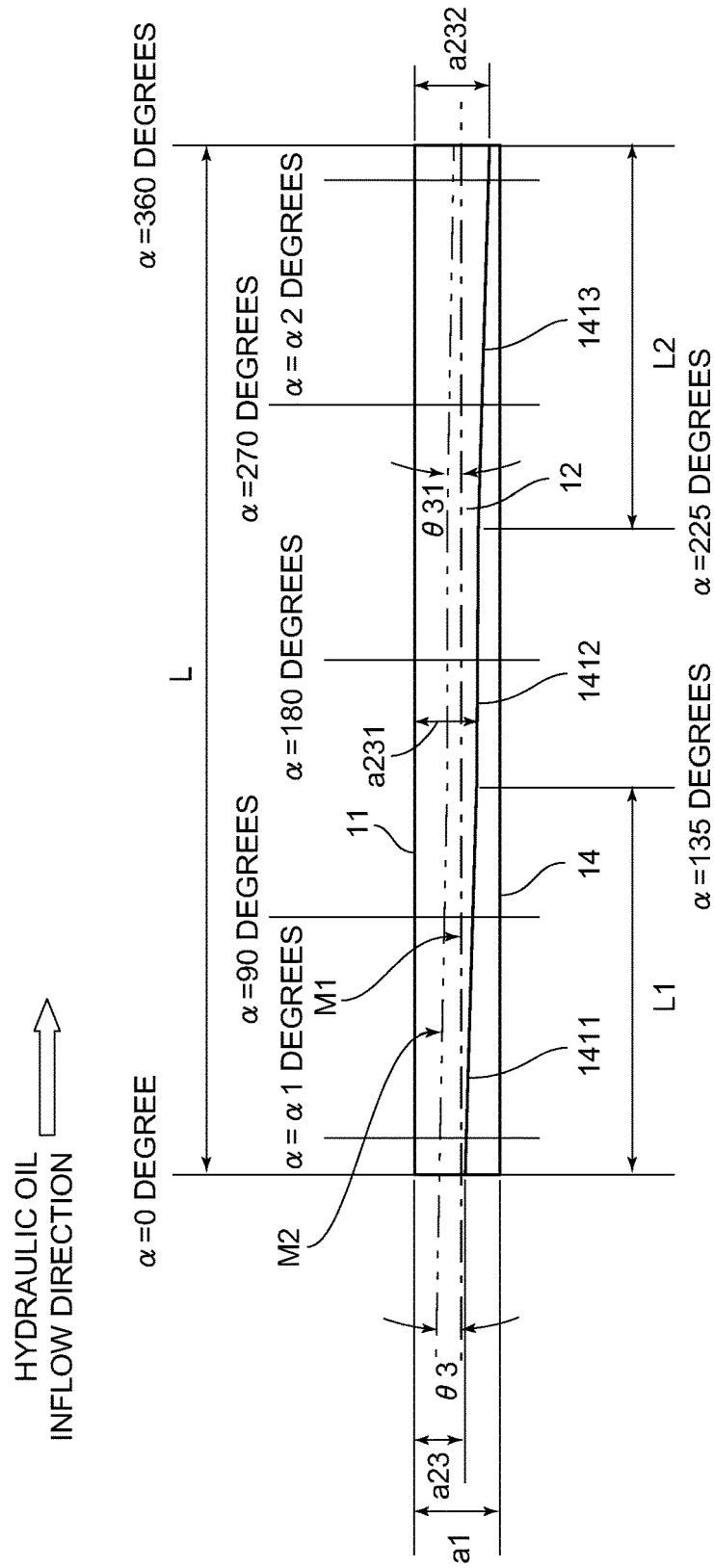
FIG. 10 is a development view of an inner peripheral surface of a seal ring according to a still another aspect of the present invention when the level difference that forms a second width is present only on the seal ring contact surface side, and a center line of the second width has a trajectory of being parallel to a trajectory of a center line of a first width in a part of the seal ring in the circumferential direction, that is, from α=135 degrees to α=225 degrees in FIG. 10.

FIG. 10 is a development view of the inner peripheral surface of the seal ring in another aspect of the present invention, in which the level difference forming the second width a2 is formed only on the seal ring contact surface 14 side and the center line M2 of the second width has a trajectory of being separated from the trajectory of the center line M1 of the first width to be parallel to the trajectory of the center line M1 of the first width in a part of the seal ring 1 in the circumferential direction, that is, from α=135 degrees to α=225 degrees in FIG. 10.

It is noted that the first width is a1, the second width at the one end of the abutting joint end surface at the one end, that is, a position at α=0 degrees in the hydraulic oil inflow direction is a23, a position in which the center line M2 of the second width is away from the trajectory of the center line M1 of the first width to be parallel to the trajectory of the center line M1 of the first width, that is, a position at α=180 degrees, is a231, and the second width on the abutment joint end surface at the another end, that is, a position at α=360 degrees) is a232. It is noted that the development length of the seal ring 1 is L, an angle formed between the trajectory of the center line M1 of the first width and the trajectory of the center line M2 of the second width is θ3 within a range in which the development length at the one end on the abutment joint portion side is L1, and an angle formed between the trajectory of the center line M1 of the first width and the trajectory of the center line M2 of the second width is θ31 within a range in which the development length at the another end on the abutment joint portion side is L2.

Here, relationships of tan θ3=(a231−a23)/2L1 and tan θ31=(a232−a231)/2L2 are satisfied.

In FIG. 7(A) and FIG. 10, when a21=a23 and a211=a232 are both satisfied, θ3>θ1 and θ31>θ1 can be both satisfied. In the embodiment of FIG. 10, the dynamic pressure effect can be partially enhanced as compared with the embodiment of FIG. 7(A).

The trajectory of the center line M2 of the second width, which is set to be parallel to the trajectory of the center line M1 of the first width, is allowed to be applied with an arbitrary length at any position in the seal ring circumferential direction. Further, even on the seal ring 1 having the level differences on both the seal ring contact surface 14 side and the seal ring pressure-receiving surface 11 side illustrated in FIG. 8, the contact surface-side non-contact surface 141 having a surface parallel to the trajectory of the center line M1 of the first width and the pressure-receiving surface-side non-contact surface 111 can be formed so as to adopt a trajectory similar to the trajectory of the center line M2 of the second width as illustrated in FIG. 10.

Figure 11:
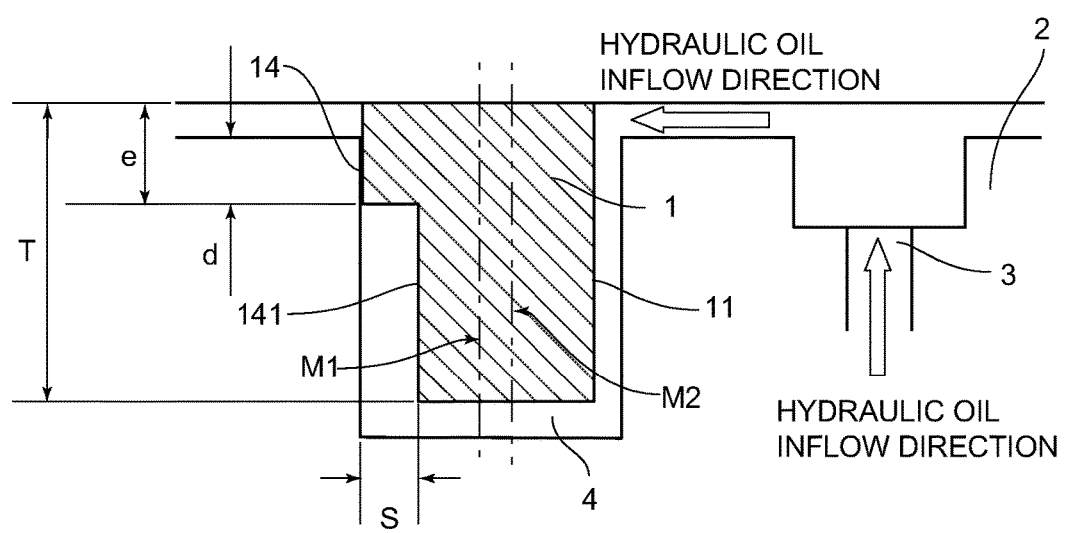
FIG. 11 is a view for illustrating a state in which the seal ring according to the present invention as illustrated in FIG. 2

FIG. 11 is a view for illustrating a state in which the seal ring according to the present invention as illustrated in FIG. 2, FIG. 5, and FIG. 7(B) is mounted to a shaft annular groove. A longitudinal sectional shape of the seal ring is obtained at a position corresponding to the circumferential position of α=90 degrees.

The trajectory of the center line M2 of the second width of the seal ring is positioned on the pressure-receiving surface side with respect to the trajectory of the center line M1 of the first width over the entire periphery in the circumferential direction. There is illustrated a gap S between a side surface of the shaft annular groove and the contact-surface side non-contact surface 141. The gap S falls within a range of a1−a21≥S≥a1−a211 (see FIG. 7(A)). The gap S is gradually narrowed from the angle α=0 degrees to the angle α=360 degrees in the seal ring circumferential direction, and thus the inflow hydraulic oil generates the dynamic pressure effect thereby. A contact length between the seal ring contact surface 14 and the side surface of the shaft annular groove in the radial direction is indicated by d.

In terms of abrasion resistance of the seal ring, d≥0.35 mm is preferred. In terms of oil leakage, d≥0.2 mm is further preferred. Further, when a thickness of the seal ring is T, 2e≤T≤4e is suitable for the length e of the seal ring contact surface in the radial direction. Further, e and d have a relationship: e>d.

Figure 12A:
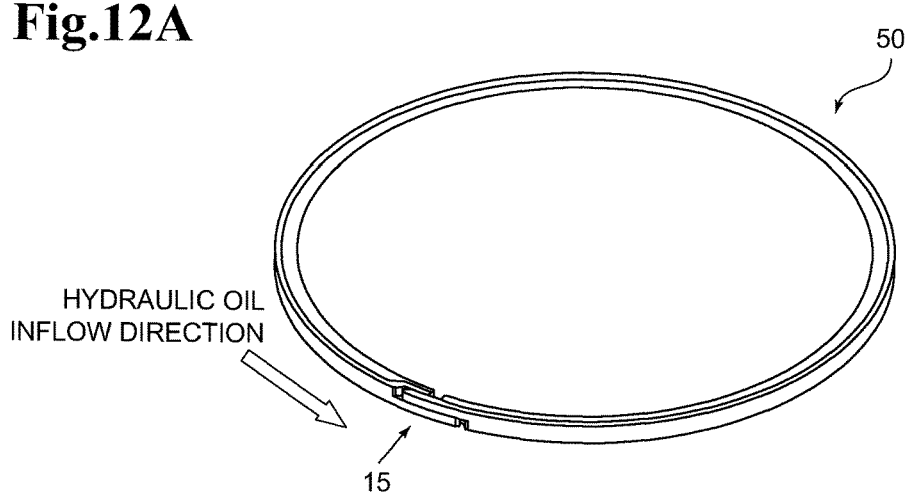
FIG. 12(A) is a perspective view of a seal ring according to Comparative Example 1 as viewed from a contact surface side.
Figure 12B:
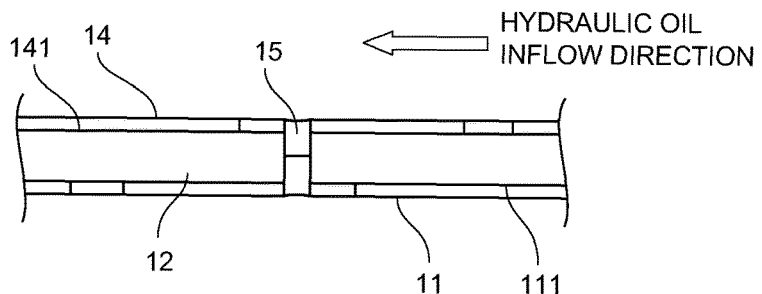
FIG. 12(B) is a front view of an abutment joint portion as viewed from an inner peripheral surface side.
Figure 12C:
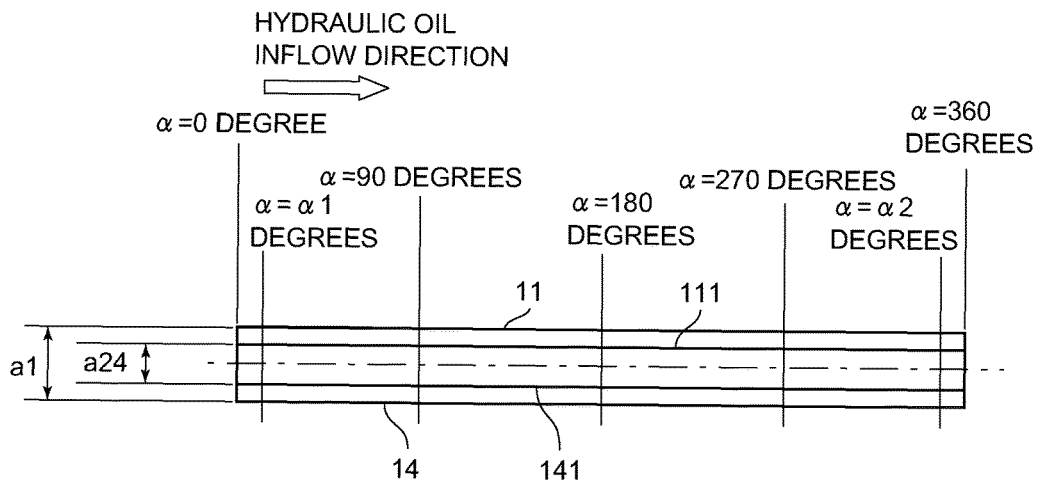
FIG. 12(C) is a development view of the abutment joint portion as viewed from the inner peripheral surface side.

As Comparative Example 1, FIG. 12A to FIG. 12C are a perspective view of a seal ring 50 as viewed from the contact surface side (see FIG. 12(A)), a front view of the abutment joint portion as viewed from the inner peripheral surface side (see FIG. 12(B)), and a development view of the abutment joint portion as viewed from the inner peripheral surface side (see FIG. 12(C)).

Figure 13A:
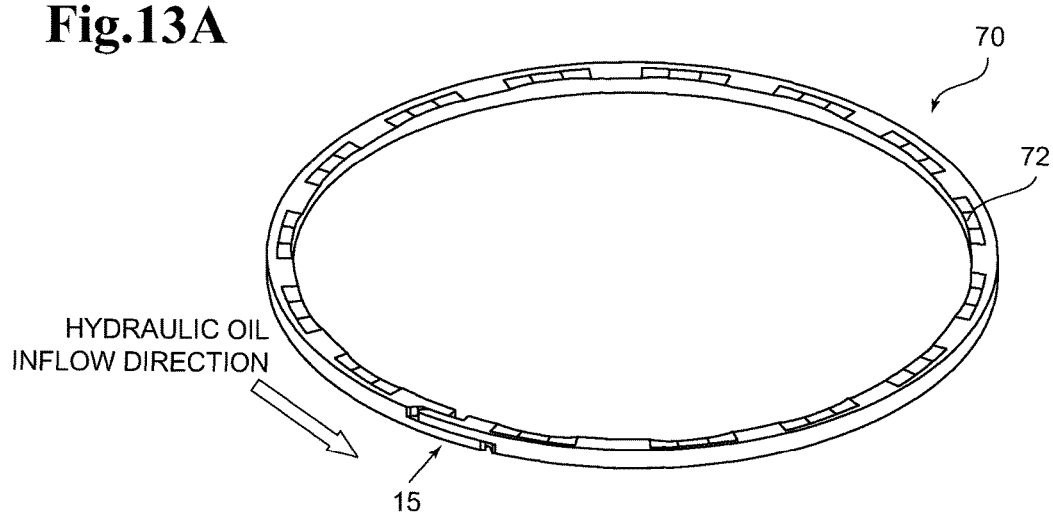
FIG. 13(A) is a perspective view of a seal ring according to Comparative Example 2 as viewed from a contact surface side.
Figure 13B:
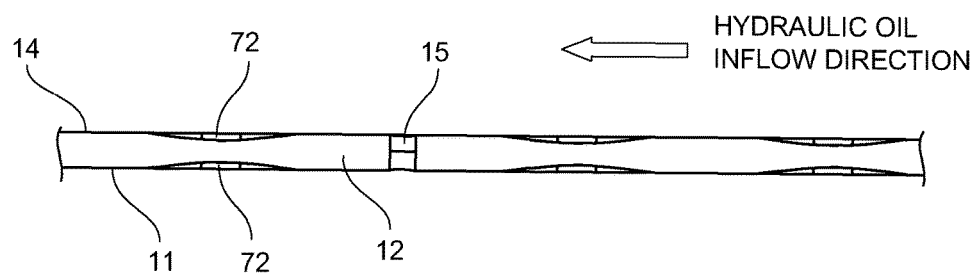
FIG. 13(B) is a front view of an abutment joint portion as viewed from an inner peripheral surface side.
Figure 13C:
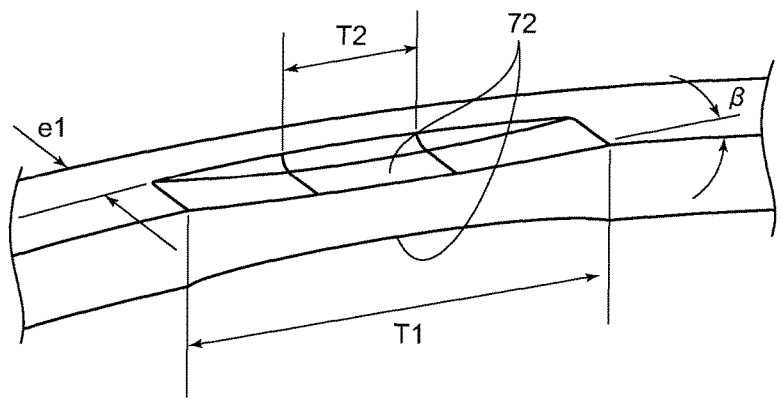
FIG. 13(C) is a perspective view of a V-groove.

As Comparative Example 2, FIG. 13A to FIG. 13C are a perspective view of a seal ring 70 as viewed from the contact surface side (see FIG. 13(A)), a front view of the abutment joint portion as viewed from the inner peripheral surface side (see FIG. 13(B)), and a perspective view of a V-groove 72 (see FIG. 13(C)).

FIG. 14(A) to FIG. 14(E) are longitudinal sectional views of the seal ring according to a further embodiment as viewed in the circumferential direction of the hydraulic oil inflow direction.

A seal ring 101 illustrated in FIG. 14(A) is a seal ring 101 having a level difference only on the contact surface 14 side. The level difference portion that forms the second width a2 is not parallel to a seal ring outer peripheral surface 13 and has a tapered shape.

FIG. 14(B) is a view for illustrating an example of a sectional shape including the shaft annular groove 4. A seal ring 103 illustrated in FIG. 14(B) is a seal ring 103 having level differences on both the seal ring contact surface 14 side and the seal ring pressure-receiving surface 11 side, in which the seal ring inner peripheral surface 12 has an arc-like shape. This seal ring provides good flowablility of the hydraulic oil toward the seal ring contact surface 14 and has a shape for allowing a pressing pressure to be exerted in a direction toward the housing at a timing earlier than that with a rectangular cross section, and is suitable to avoid interference with an inner periphery-side corner portion of the shaft annular groove 4.

FIG. 14(C) is a view for illustrating an example of a sectional shape including the shaft annular groove 4.

A seal ring 105 illustrated in FIG. 14(C) is a seal ring 105 having a level difference only on the contact surface 14 side, in which the seal ring inner peripheral surface 12 has an arc-like shape. The seal ring 105 is suitable as a shape for allowing a pressure for pressing the seal ring to be exerted in both the direction toward the housing and a direction toward the side surface wall of the shaft annular groove 4.

A seal ring 107 illustrated in FIG. 14(D) is a seal ring 107 having level differences both on the seal ring contact surface 14 side and the seal ring pressure-receiving surface 11 side, and has a third width a3.

A seal ring 109 illustrated in FIG. 14(E) is a seal ring having level differences both on the seal ring contact surface 14 side and the seal ring pressure-receiving surface 11 side, and has the third width a3.

The seal rings illustrated in FIG. 14(D) and FIG. 14(E) have shapes suitable for improving poor ease of assembly that the seal ring outer peripheral surface 13 greatly projects from a shaft outer peripheral surface to prevent smooth insertion into a shaft hole of the housing when a clearance between the seal ring inner peripheral surface 12 and an inner peripheral surface of the shaft annular groove 4 is large.

Materials for the seal ring according to the present invention are not particularly limited, and polyether ether ketone (PEEK), polyphenylene sulfide (PPS), polyimide (PI), polyamide-imide (PAI), and fluorine-based resins, such as polytetrafluoroethylene (PTFE), modified polytetrafluoroethylene, and ethylene tetrafluoroethylene (ETFE), are used. In general, a material obtained by adding an additive such as carbon powder, reinforced fiber, or a solid lubricant to the above-mentioned resins is preferably used.

A method of manufacturing a seal ring according to the present invention is not particularly limited. However, it is preferred that the seal ring be manufactured by injection molding when a thermoplastic resin such as PEEK, PPS, or PI is used. Further, when a fluorine resin is used, the seal ring can be manufactured by machine working after compression molding.

Examples of the seal ring of the present invention are now described. However, the present invention is not limited only to the examples described below.

First Example

FIG. 2(A) to FIG. 2(C), FIG. 3, FIG. 5(A) to FIG. 5(E), and FIG. 7(A) to FIG. 7(B)

The seal ring 1 of Example 1 has the level difference that forms the second width only on the contact surface side, and has the sectional shape of FIG. 5. In FIG. 7, the trajectory of the center line of the second width has $\theta 1=0.13$ degree with respect to the trajectory of the center line of the first width over the entire periphery in the seal ring circumferential direction, specifically, the gap S between the contact surface 14 and the contact surface-side non-contact surface 141 (see FIG. 11) decreases toward the abutment joint of the seal ring at the another end. The abutment joint has a composite step type shape. A gap in the abutment joint is 0.5 mm when the seal ring is mounted to the housing.

Seal ring material: polyphenylene sulfide (PPS) material, seal ring outer diameter: 53 mm, first width a1: 1.5 mm, seal ring thickness T: 1.95 mm, first width thickness e: 0.65 mm (radial direction length d (design value) of the seal ring brought into contact with the side wall surface of the shaft annular groove: 0.35 mm), second width a21 (angle of $\alpha=0$ degrees): 0.97 mm, second width a211 (angle of $\alpha=360$ degrees): 1.35 mm.

Second Example

FIG. 4(A) to FIG. 4(C), FIG. 6(A) to FIG. 6(E), FIG. (8A), FIG. 8(B), and FIG. 9

In contrast to the seal ring 1 of Example 1, the seal ring 30 of Example 2 has the level differences that form the second width both on the contact surface side and the pressure-receiving surface side, and has the sectional shape of FIG. 6. In FIG. 8, the trajectory of the center line of the second width has $\theta 1=0.13$ degree with respect to the trajectory of the center line of the first width over the entire periphery in the seal ring circumferential direction, specifically, the gap S between the contact surface 14 and the contact-surface side non-contact surface 141 (see FIG. 11) decreases toward the abutment joint of the seal ring at the another end. Precisely contrary to the seal ring contact surface 14 side, on the seal ring pressure-receiving surface 11 side, the gap S (see FIG. 11) increases toward the abutment joint of the seal ring at the another end. The abutment joint has a composite step type shape. A gap in the abutment joint is 0.5 mm when the seal ring is mounted to the housing.

Seal ring material: polyphenylene sulfide (PPS) material, seal ring outer diameter: 53 mm, first width a1: 1.5 mm, seal ring thickness T: 1.95 mm, first width thickness e: 0.65 mm (radial direction length d (design value) of the seal ring brought into contact with the side wall surface of the shaft annular groove: 0.35 m), b=0.53 mm, second width a22 (angle of $\alpha=0$ degrees): 0.82 mm, second width a221 (angle of $\alpha=360$ degrees): 0.82 mm.

Comparative Example 1

In the seal ring 50 of Comparative Example 1, which is illustrated in FIG. 12, the trajectory of the center line of the second width matches with the trajectory of the center line of the first width over the entire periphery in the seal ring circumferential direction and $\theta 2=0$ degrees in FIG. 8(A). Specifically, the gap S (see FIG. 11) between the seal ring contact surface 14 and the contact-surface side non-contact surface 141 and the gap S (not shown) between the seal ring pressure-receiving surface 11 and the pressure-receiving surface-side non-contact surface 111 are constant over the entire periphery in the seal ring circumferential direction, and is a seal ring similar to that disclosed in Patent Literature 1. The abutment joint has a composite step type shape. A gap in the abutment joint is 0.5 mm when the seal ring is mounted to the housing.

Seal ring material: polyphenylene sulfide (PPS) material, seal ring outer diameter: 53 mm, first width a1: 1.5 mm, seal ring thickness T: 1.95 mm, first width thickness e: 0.65 mm (radial direction length d (design value) of the seal ring brought into contact with the side wall surface of the shaft annular groove: 0.35 mm), b=0.34 mm, second width a24 (angle of $\alpha=0$ degrees): 0.82 mm, second width a24 (angle of $\alpha=360$ degrees): 0.82 mm.

Comparative Example 2

The seal ring 70 of Comparative Example 2, which is illustrated in FIG. 13(A) to FIG. 13(C), has V-shaped concave portions (V-grooves) 72 along the seal ring circumferential direction, which are non-contact portions with the side wall surface of the shaft annular groove and are formed on a part of the inner periphery-side end portion of the seal ring contact surface, and is a seal ring similar to that disclosed in Patent Literature 2. The abutment joint has a composite step type shape. A gap in the abutment joint is 0.5 mm when the seal ring is mounted to the housing.

Seal ring material: polyphenylene sulfide (PPS) material, seal ring outer diameter: 53 mm, first width a1: 1.5 mm, seal ring thickness T: 1.95 mm, first width thickness e1: 0.65 mm (radial direction length d (design value) of the seal ring brought into contact with the side wall surface of the shaft annular groove: 0.35 mm). A V-groove shape has a circumferential width T1=6 mm, T2=2 mm, and β=11 degrees. The V-grooves 72 are formed at fifteen positions on each of the pressure-receiving surface and the contact surface.

(Seal Ring Test)

Figure 15:
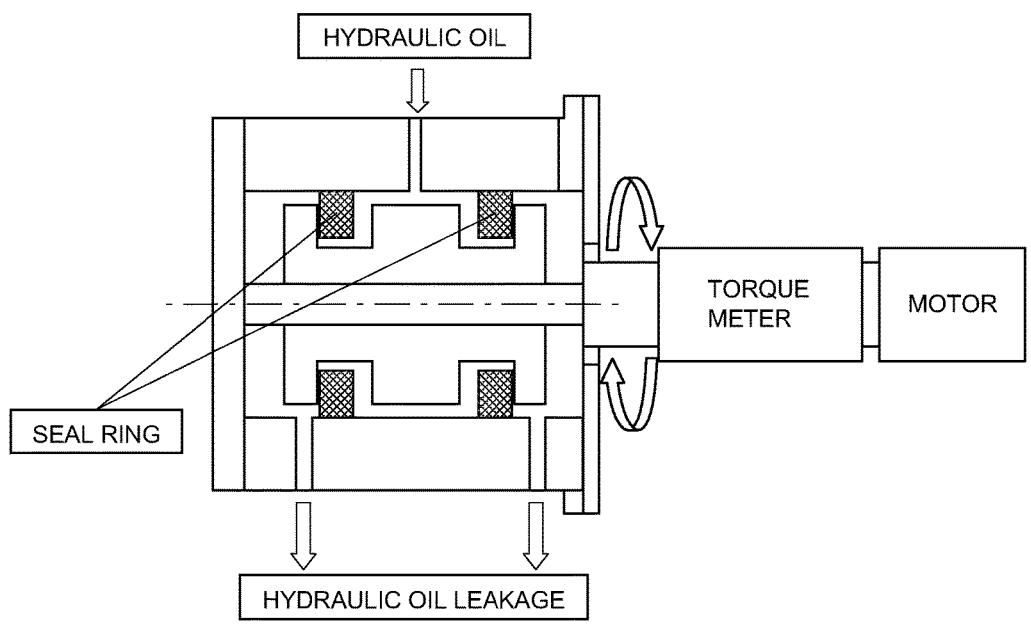
FIG. 15 is a schematic view for illustrating a seal ring test machine.

FIG. 15 is a schematic view of a seal ring test machine 80. A shaft rotation torque test and an oil leakage test were carried out by using this seal ring test machine. A rotation torque and a loss were detected by a torque detector (manufactured by Ono Sokki Co., Ltd: TH-2504).

(1) For the housing, a material was carbon steel S45C of the Japanese Industrial Standard, and a housing inner diameter was set to 53 mm.

(2) For the shaft, a material was carbon steel S45C of the Japanese Industrial Standard, a shaft outer diameter was set to 52.4 mm, the shaft annular groove had a groove width set to 1.5 mm and a groove bottom diameter set to 48 mm (groove depth set to 1.95 mm), and a side wall surface roughness Ra was set to 0.8 μm.

(3) Test conditions were as follows.

Hydraulic oil type: automatic transmission fluid (ATF)
Oil temperature: 80° C.
Hydraulic pressure (MPa): three levels, that is, 0.3, 0.6, and 1.2
Shaft rotation frequency (rpm): 1,000 to 9,000
Friction measurement time (sec): 60
Oil leakage measurement time (sec): 60

(Test Result of Shaft Rotation Torque)

Figure 16:
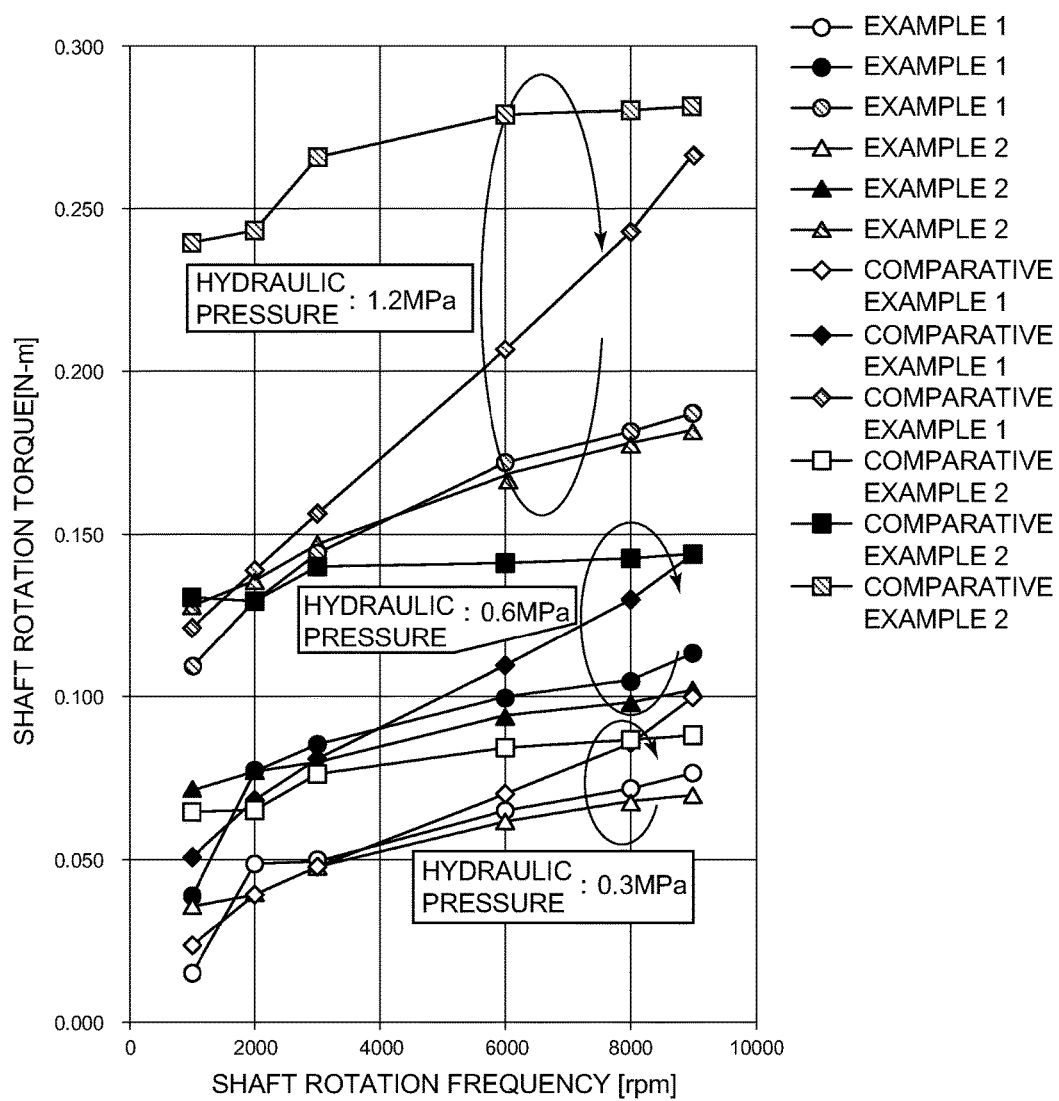
FIG. 16 is a graph for showing a relationship between a shaft rotation frequency and a shaft rotation torque when a hydraulic pressure is changed in Example 1, Example 2, Comparative Example 1, and Comparative Example 2.

FIG. 16 is a graph for showing a relationship between the shaft rotation frequency (rpm) and the shaft rotation torque (N·m) when the hydraulic pressure was changed from 0.3 MPa to 1.2 MPa. In Example 1 and Example 2, even when the shaft rotation speed exceeded 3,000 rpm, the shaft rotation torque did not suddenly increase within the range of the hydraulic pressure up to 1.2 MPa.

Meanwhile, in Comparative Example 1, when the shaft rotation speed exceeded 3,000 rpm, the shaft rotation torque was proportional to the shaft rotation speed within the range of the hydraulic pressure from 0.3 MPa to 1.2 MPa. And, a gradient of the graph became steeper as the hydraulic pressure increased.

In Comparative Example 2, the shaft rotation torque was high at each hydraulic pressure within the entire range of the shaft rotation speed of from 1,000 rpm to 9,000 rpm in contrast to Example 1, Example 2, and Comparative Example 1. However, a difference between the shaft rotation torque at the shaft rotation speed of 5,000 rpm and the shaft rotation torque at 9,000 rpm was small.

(Observation)

In both Example 1 and Example 2, a level of the shaft rotation torque is low over the entire range, which is considered as a result of function of the dynamic pressure effect in a region in which the shaft rotation frequency exceeds 3,000 rpm. In Comparative Example 1, the shaft rotation torque is proportional to the shaft rotation speed when the shaft rotation frequency is 3,000 rpm or higher, which results in no generation of the dynamic pressure effect. The contact area between the seal ring contact surface and the side wall surface of the shaft annular groove is the same in Example 1, Example 2, and Comparative Example 1. When the shaft rotation frequency is 3,000 rpm or smaller, the shaft rotation torque of Comparative Example 1 is at the same level as those of Example 1 and Example 2.

In Comparative Example 2, a sudden increase in shaft rotation torque is not observed even after the shaft rotation frequency exceeds 3,000 rpm, which is considered as a result of the function of the dynamic pressure effect. Further, in Comparative Example 2, the contact area between the seal ring contact surface and the side wall surface of the shaft annular groove is large as compared with those in Example 1, Example 2, and Comparative Example 1, which is considered as a factor of a high level of the shaft rotation torque over the entire range.

(Test Result of Oil Leakage Amount)

In Table 1 below, a test result of an oil leakage amount is shown.

In Example 1, Example 2, and Comparative Example 1, approximately the same results of the oil leakage amount are obtained within a fluctuation range of the shaft rotation frequency and a fluctuation range of the hydraulic pressure as shown in Table 1 below and therefore are good results.

In Comparative Example 2, a level of the oil leakage amount is high over the entire range. As a level of the hydraulic pressure becomes lower than 0.6 MPa, the oil leakage amount increases. When the hydraulic pressure is at a level as high as 1.2 MPa, the oil leakage amount is kept stable at the low level. However, a value of the oil leakage in Comparative Example 2 is three to four times as large as those of the Example 1, Example 2, and Comparative Example 1.

(Observation)

For Comparative Example 2, the dynamic pressure effect is observed in a range in which the shaft rotation frequency is 3,000 rpm or more and the hydraulic pressure is 0.3 MPa or more in the shaft rotation torque test, which is considered to be a factor of the generation of the gap between the seal ring contact surface and the side wall surface of the shaft annular groove.

TABLE 1

| Hydraulic pressure of hydraulic oil Mpa | Shaft rotation speed rpm | Oil Leakage amount [ml/min] | | | |
|---|---|---|---|---|---|
| | | Example 1 | Example 2 | Comparative Example 1 | Comparative Example 2 |
| 0.3 | 1,000 | 0.9 | 0.8 | 0.8 | 3.5 |
| | 2,000 | 1.1 | 1.0 | 0.9 | 12.2 |
| | 3,000 | 1.1 | 1.1 | 0.9 | 23.2 |
| | 6,000 | 1.3 | 1.2 | 1.1 | 48.1 |
| | 8,000 | 1.4 | 1.4 | 1.4 | 68.3 |
| | 9,000 | 1.5 | 1.5 | 1.5 | 78.9 |
| 0.6 | 1,000 | 1.5 | 1.6 | 1.3 | 6.8 |
| | 2,000 | 1.6 | 1.9 | 1.9 | 11.4 |
| | 3,000 | 2.5 | 2.4 | 2.9 | 15.5 |
| | 6,000 | 3.1 | 2.9 | 3.1 | 30.1 |
| | 8,000 | 3.2 | 3.2 | 3.4 | 34.2 |
| | 9,000 | 3.2 | 3.3 | 3.6 | 37.4 |
| 1.2 | 1,000 | 3.6 | 3.5 | 3.2 | 9.9 |
| | 2,000 | 3.9 | 3.9 | 3.6 | 13.9 |
| | 3,000 | 4.4 | 4.3 | 4.5 | 14.5 |
| | 6,000 | 4.6 | 4.6 | 4.4 | 13.9 |
| | 8,000 | 4.7 | 4.8 | 4.5 | 16.2 |
| | 9,000 | 4.9 | 4.9 | 4.6 | 18.5 |

REFERENCE SIGNS LIST 1, 30, 50, 70 seal ring
2 shaft
3 hydraulic oil passage
4 shaft annular groove
5 housing
11 seal ring pressure-receiving surface
12 seal ring inner peripheral surface

13 seal ring outer peripheral surface
14 seal ring contact surface
15 seal ring abutment joint portion
111 pressure-receiving surface-side non-contact surface
112 second pressure-receiving surface-side non-contact surface
141 contact surface-side non-contact surface
142 second contact surface-side non-contact surface
151 seal ring abutment joint end surface
152 seal ring abutment joint end surface
80 seal ring test machine Drawings

FIG. 1

FLOW OF HYDRAULIC OIL

FIG. 2(A)

HYDRAULIC OIL INFLOW DIRECTION

FIG. 2(C)

(1)   HYDRAULIC OIL INFLOW DIRECTION (2)   POSITION AT α=α1 DEGREES (3)   POSITION AT α=α2 DEGREES

FIG. 3

(1)   HYDRAULIC OIL INFLOW DIRECTION (2)   90 DEGREES

FIG. 4(A)

HYDRAULIC OIL INFLOW DIRECTION

FIG. 4(C)

(1)   HYDRAULIC OIL INFLOW DIRECTION (2)   POSITION AT α=α1 DEGREES (3)   POSITION AT α=α2 DEGREES

FIG. 5(A)

(1) CROSS SECTION TAKEN ALONG LINE 5A-5A (2) α=α1 DEGREES (3) CENTER LINE OF FIRST WIDTH (4) FIRST WIDTH (5) CENTER LINE OF SECOND WIDTH (6) SECOND WIDTH

FIG. 5(B)

(1) CROSS SECTION TAKEN ALONG LINE 5B-5B (2) α=90 DEGREES

FIG. 5(C)

(1) CROSS SECTION TAKEN ALONG LINE 5C-5C (2) α=180 DEGREES

FIG. 5(D)

(1) CROSS SECTION TAKEN ALONG LINE 5D-5D (2) α=270 DEGREES

FIG. 5(E)

(1) CROSS SECTION TAKEN ALONG LINE 5E-5E (2) α=α2 DEGREES

FIG. 6(A)

(1) CROSS SECTION TAKEN ALONG LINE 6A-6A (2) α=α1 DEGREES

FIG. 6(B)

(1) CROSS SECTION TAKEN ALONG LINE 6B-6B (2) α=90 DEGREES

FIG. 6(C)

(1) CROSS SECTION TAKEN ALONG LINE 6C-6C (2) α=180 DEGREES (3) CENTER LINES BEING MATCHED

FIG. 6(D)

(1) CROSS SECTION TAKEN ALONG LINE 6D-6D (2) α=270 DEGREES

FIG. 6(E)

(1) CROSS SECTION TAKEN ALONG LINE 6E-6E (2) α=α2 DEGREES

FIG. 7(A)

(1) HYDRAULIC OIL INFLOW DIRECTION (2) α=0 DEGREE (3) α=α1 DEGREES (4) α=90 DEGREES (5) α=180 DEGREES (6) α=270 DEGREES (7) α=α2 DEGREES (8) α=360 DEGREES

FIG. 7(B)

α=90 DEGREES

FIG. 8(A)

(1) HYDRAULIC OIL INFLOW DIRECTION (2) α=0 DEGREE (3) α=α1 DEGREES (4) α=90 DEGREES (5) α=180 DEGREES (6) α=270 DEGREES (7) α=α2 DEGREES (8) α=360 DEGREES

FIG. 8(B)

(1) α=90 DEGREES

FIG. 9

(1) HYDRAULIC OIL INFLOW DIRECTION (2) α=0 DEGREE (3) α=α1 DEGREES (4) α=90 DEGREES (5) α=270 DEGREES (6) α=α2 DEGREES (7) α=360 DEGREES

FIG. 10

(1) HYDRAULIC OIL INFLOW DIRECTION (2) α=0 DEGREE (3) α=α1 DEGREES (4) α=90 DEGREES (5) α=135 DEGREES (6) α=180 DEGREES (7) α=225 DEGREES (8) α=270 DEGREES (9) α=α2 DEGREES

(10) α=360 DEGREES

FIG. 11

HYDRAULIC OIL INFLOW DIRECTION

FIG. 12(A)

HYDRAULIC OIL INFLOW DIRECTION

FIG. 12(B)

(1) HYDRAULIC OIL INFLOW DIRECTION

FIG. 12(C)

(1) HYDRAULIC OIL INFLOW DIRECTION (2) $\alpha=0$ DEGREE (3) $\alpha=\alpha1$ DEGREES (4) $\alpha=90$ DEGREES (5) $\alpha=180$ DEGREES (6) $\alpha=270$ DEGREES (7) $\alpha=\alpha2$ DEGREES (8) $\alpha=360$ DEGREES

FIG. 13(A)

HYDRAULIC OIL INFLOW DIRECTION

FIG. 13(B)

HYDRAULIC OIL INFLOW DIRECTION

FIG. 15

(1) HYDRAULIC OIL (2) SEALING (3) HYDRAULIC OIL LEAKAGE (4) TORQUE METER (5) MOTOR

FIG. 16

(1) EXAMPLE 1

(2)  EXAMPLE 2

(3)  COMPARATIVE EXAMPLE 1

(4)  COMPARATIVE EXAMPLE 2

(5)  SHAFT ROTATION TORQUE (6)  SHAFT ROTATION SPEED (7)  HYDRAULIC PRESSURE

The invention claimed is:

1. A seal ring, which is to be used in a hydraulic sealing device including a housing having a shaft hole and a shaft to be inserted into the shaft hole, the seal ring to be mounted to a shaft annular groove formed in the shaft, to be brought into contact with an inner peripheral surface of the housing, and to be brought into slidable contact with a side wall surface of the shaft annular groove, which is opposed to a side to which a sealed fluid flows, so as to seal an annular gap between the housing and the shaft, wherein, when an axial width of a seal ring outer peripheral surface is a first width, a longitudinal sectional shape of the sealing ring as viewed in a circumferential direction has the first width as a maximum axial width of the seal ring and has a first level difference portion that forms a second width smaller than the first width at a position from the seal ring outer peripheral surface to a seal ring inner peripheral surface, wherein the first level difference portion is present over an entire periphery in the circumferential direction on, at least, a seal ring contact surface among the seal ring contact surface and a seal ring pressure-receiving surface, the seal ring contact surface being slidably contacted with the side wall surface of the shaft annular groove that forms an axial width wider than the first width, the seal ring pressure-receiving surface being opposing to the seal ring contact surface, wherein the first level difference portion is formed so that, at seal ring abutment joint portions of the seal ring which are opposed to each other, a center line of the second width on an abutment joint end surface on an inner periphery side of a seal ring abutment joint portion at one end at which the abutment joint end surface of the seal ring is positioned on the side to which the sealed fluid flows is positioned on a side closer to the seal ring pressure-receiving surface with respect to a center line of the first width on the same longitudinal cross section of the seal ring as viewed in the circumferential direction, wherein the first level difference portion is formed so that the center line of the second width on an abutment joint end surface at another end on the inner periphery side of the seal ring abutment joint portion is positioned on a side closer to the seal ring contact surface with respect to the center line of the second width on the abutment joint end surface at the one end on the inner periphery side of the seal ring, wherein the first level difference portion is formed so that the center line of the second width in the circumferential direction of the seal ring in which the sealed fluid flows draws a trajectory of extending along the circumferential direction and shifting from the abutment joint end surface on the inner periphery side of the seal ring abutment joint portion at the one end toward the abutment joint end surface on the inner periphery side of the seal ring abutment joint portion at the another end so as to be closer to the seal ring contact surface; and wherein a gap between the side surface of the shaft annular groove and a contact-surface-side non-contact surface is gradually narrowed from a first seal ring abutment joint portion at the one end to a second seal ring abutment joint portion at the another end.

2. A seal ring according to claim 1, wherein the first level difference portion that forms the second width is present on both of the seal ring contact surface and the seal ring pressure-receiving surface and the longitudinal sectional shape of the seal ring as viewed in the circumferential direction is a convex shape, a trapezoidal shape, or an arc-like shape in a direction toward the seal ring inner peripheral surface.

3. A seal ring according to claim 1, wherein the first level difference portion that forms the second width is present only on the seal ring contact surface side, and the longitudinal sectional shape of the seal ring as viewed in the circumferential direction is an arc-like shape so that a distance from the side wall surface of the shaft annular groove increases in a direction toward the seal ring inner peripheral surface on the seal ring pressure-receiving surface side.

4. A seal ring according to any one of claims 2 and 3, wherein, when an axial width of the seal ring outer peripheral surface is a first width, the first width is a maximum axial width of the seal ring, the first level different portion forming a second width smaller than the first width at a position from the seal ring outer peripheral surface to a seal ring inner peripheral surface, and further comprising:

a second level difference portion that forms a third width as an axial width smaller than the second width on an inner periphery side of the first level difference portion that forms the second width from the seal ring outer peripheral surface side, wherein the longitudinal sectional shape of the seal ring, which forms the third width, as viewed in the circumferential direction is a convex shape, a trapezoidal shape, or an arc-like shape in a direction toward the seal ring inner peripheral surface.

* * * * *